(12) United States Patent
Collins

(10) Patent No.: US 9,953,054 B2
(45) Date of Patent: Apr. 24, 2018

(54) SYSTEMS AND METHODS FOR IMPLEMENTING AND MAINTAINING SAMPLED TABLES IN A DATABASE SYSTEM

(71) Applicant: salesforce.com, inc., San Francisco, CA (US)

(72) Inventor: Jesse Yarbro Collins, Berkeley, CA (US)

(73) Assignee: salesforce.com, inc., San Francisco, CA (US)

( * ) Notice: Subject to any disclaimer, the term of this patent is extended or adjusted under 35 U.S.C. 154(b) by 122 days.

(21) Appl. No.: 14/257,901

(22) Filed: Apr. 21, 2014

(65) Prior Publication Data

US 2014/0317087 A1    Oct. 23, 2014

Related U.S. Application Data

(60) Provisional application No. 61/814,474, filed on Apr. 22, 2013.

(51) Int. Cl.
*G06F 17/30* (2006.01)
*G06F 17/27* (2006.01)

(52) U.S. Cl.
CPC .... *G06F 17/30442* (2013.01); *G06F 17/2715* (2013.01); *G06F 17/3033* (2013.01);
(Continued)

(58) Field of Classification Search
CPC ......... G06F 17/30457; G06F 17/30463; G06F 17/30442; G06F 17/3046; G06F 17/30327
See application file for complete search history.

(56) References Cited

U.S. PATENT DOCUMENTS 5,577,188 A    11/1996  Zhu
5,608,872 A    3/1997   Schwartz et al.
(Continued)

FOREIGN PATENT DOCUMENTS

EP    1211589    * 11/2001

*Primary Examiner* — Srirama Channavajjala
(74) *Attorney, Agent, or Firm* — Elliot, Ostrander & Preston, P.C.

(57) ABSTRACT

In accordance with disclosed embodiments, there are provided systems and methods for implementing and maintaining sampled tables in a database system. According to a particular embodiment such a system includes a processor and a memory to execute instructions at the system; a database to store database records; a query interface to submit queries to the database and receive results from the database; triggers to initiate a hash function on database insert transactions, the hash function to hash a primary key of each database record to be inserted into the database to determine whether a first hash value of the primary key of the database record to be inserted satisfies a sampling condition; a sample table to store a sample record corresponding to any database record to be inserted into the database which satisfies the sampling condition based on the hash function; a primary key index providing a first index of the primary keys of the sample records stored in the sample table; and an ordered hash index providing a second index on a second hash value corresponding to a second hash of the primary key of the sample records stored in the sample table ordered numerically by the second hash value. Other related embodiments are disclosed.

16 Claims, 8 Drawing Sheets

(52) U.S. Cl.
CPC .. *G06F 17/30312* (2013.01); *G06F 17/30336* (2013.01); *G06F 17/30471* (2013.01); *G06F 17/30477* (2013.01); *G06F 17/30536* (2013.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,878,426 A * | 3/1999 | Plasek ............... G06F 17/30489 |
| 5,918,159 A | 6/1999 | Fomukong et al. |
| 5,963,953 A | 10/1999 | Cram et al. |
| 5,987,453 A * | 11/1999 | Krishna ............ G06F 17/30498 |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,480,836 B1 * | 11/2002 | Colby ............... G06F 17/30312 707/717 |
| 6,519,604 B1 * | 2/2003 | Acharya ........... G06F 17/30536 707/738 |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,877,381 B2 * | 1/2011 | Ewen ............... G06F 17/30463 707/719 |
| 8,352,384 B2 | 1/2013 | Mansinghka et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0066038 A1 * | 5/2002 | Mattsson ................ G06F 21/55 726/23 |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0055813 A1 * | 3/2003 | Chaudhuri ........ G06F 17/30469 |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0088558 A1 * | 5/2003 | Zaharioudakis .. G06F 17/30457 |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0111410 A1 * | 6/2004 | Burgoon ........... G06F 17/30536 |
| 2004/0128001 A1 | 7/2004 | Levin et al. |
| 2004/0186829 A1 * | 9/2004 | Suzuki ............. G06F 17/30306 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0210621 A1 * | 10/2004 | Antonellis ........... G06Q 10/087 709/200 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0007978 A1 | 1/2005 | Slemmer et al. |
| 2005/0050555 A1 | 3/2005 | Exley et al. |
| 2005/0091098 A1 | 4/2005 | Brodersen et al. |
| 2005/0262158 A1 * | 11/2005 | Sauermann ....... G06F 17/30595 |
| 2006/0074874 A1 * | 4/2006 | Day ................ G06F 17/30463 |
| 2007/0027864 A1 | 2/2007 | Collins et al. |
| 2007/0124276 A1 * | 5/2007 | Weissman ......... G06F 17/30442 |
| 2007/0174256 A1 * | 7/2007 | Morris ............. G06F 17/30536 |
| 2007/0226187 A1 * | 9/2007 | Beatty ............. G06F 17/30587 |
| 2008/0082555 A1 | 4/2008 | Salmon et al. |
| 2008/0301228 A1 | 12/2008 | Flavin |
| 2009/0198684 A1 | 8/2009 | Collins et al. |
| 2010/0070528 A1 | 3/2010 | Collins et al. |
| 2010/0223269 A1 * | 9/2010 | Shuf ................ G06F 17/30486 707/753 |
| 2010/0241951 A1 | 9/2010 | Vandervort et al. |

(56) References Cited

U.S. PATENT DOCUMENTS

| | | |
|---|---|---|
| 2010/0257181 A1* | 10/2010 | Zhou .................. G06F 17/3033 707/747 |
| 2010/0274779 A1* | 10/2010 | Weissman ......... G06F 17/30442 707/714 |
| 2011/0004668 A1 | 1/2011 | Salmon et al. |
| 2011/0082854 A1 | 4/2011 | Eidson et al. |
| 2011/0119352 A1 | 5/2011 | Perov et al. |
| 2011/0246449 A1 | 10/2011 | Collins et al. |
| 2011/0258178 A1 | 10/2011 | Eidson et al. |
| 2011/0258179 A1 | 10/2011 | Weissman et al. |
| 2011/0282847 A1 | 11/2011 | Collins et al. |
| 2011/0282864 A1 | 11/2011 | Collins et al. |
| 2011/0282881 A1 | 11/2011 | Collins et al. |
| 2011/0289091 A1 | 11/2011 | Collins et al. |
| 2011/0295838 A1 | 12/2011 | Collins et al. |
| 2011/0295839 A1 | 12/2011 | Collins et al. |
| 2011/0320435 A1 | 12/2011 | Collins et al. |
| 2012/0023375 A1 | 1/2012 | Dutta et al. |
| 2012/0036452 A1 | 2/2012 | Coleman et al. |
| 2012/0131068 A1 | 5/2012 | Scotton et al. |
| 2012/0151062 A1 | 6/2012 | Gusev et al. |
| 2012/0191698 A1* | 7/2012 | Albrecht ........... G06F 17/30442 707/718 |
| 2012/0203859 A1 | 8/2012 | Krzyzanowski |
| 2012/0233354 A1 | 12/2012 | Salmon et al. |
| 2012/0330924 A1 | 12/2012 | Rajan et al. |
| 2012/0330926 A1 | 12/2012 | Rajan et al. |
| 2013/0013750 A1 | 1/2013 | Butler et al. |
| 2013/0018890 A1 | 1/2013 | Rajan et al. |
| 2013/0054648 A1 | 2/2013 | Mehta et al. |
| 2014/0012817 A1 | 1/2014 | Kim et al. |
| 2014/0040235 A1 | 2/2014 | Rajan et al. |
| 2014/0081950 A1 | 3/2014 | Rajan et al. |
| 2014/0114926 A1* | 4/2014 | Anderson ............... G06F 17/30 707/687 |
| 2014/0317087 A1* | 10/2014 | Collins ............. G06F 17/30442 707/715 |

* cited by examiner

SYSTEMS AND METHODS FOR IMPLEMENTING AND MAINTAINING SAMPLED TABLES IN A DATABASE SYSTEM

CLAIM OF PRIORITY

This application is related to, and claims priority to, the provisional utility application entitled "MAINTAINING SAMPLED TABLES IN A MULTI-TENANT DATABASE SYSTEM," filed on Apr. 22, 2013, having an application No. 61/814,474, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to systems and methods for implementing and maintaining sampled tables in a database system. Such means may be implemented within the computing architecture of a hosted computing environment, such as an on-demand or cloud computing environment which utilizes multi-tenant database technologies, client-server technologies, traditional database technologies, or other computing architecture in support of the hosted computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Database systems provide a means by which large quantities of information may be persistently stored, queried, and updated through a variety of query mechanisms, such as the Structured Query Language (SQL). Conventional Database Management Systems (DBMS) provide a suite of computer software providing the interface between users and the database system. In the most general sense, a database or database system stores information which may later be queried to return a dataset.

Query optimization is the process of determining a more efficient manner to query for data stored in the database. For instance, a structured query may be presented for execution against the database, but may not be structured in its most efficient form. Query optimization, or a query optimizer, may alter the query in such a way to return the same resulting dataset, but with a decreased computational load on the database system.

Table indices are an effective means by which to reduce computational load when executing a query against the databases. Indices are effective when queries that are requested for execution against the database specify common or frequently utilized columns or filters, and thus, correspond to previously indexed columns. Unfortunately, it is not feasible to index every available column of every table in a database, yet, customers are permitted to execute queries against any column in a table, regardless of whether that column has been indexed. Therefore, when a query arrives with a less common query filter, it is likely that the corresponding column will not have been indexed by the database system, leaving the query optimizer with insufficient information by which to perform its query optimization.

In such a situation, the query may thus be executed as is, without optimization, which will yield the correct result set, but may be unduly burdensome in its use of computational resources.

The present state of the art may therefore benefit from the systems and methods for implementing and maintaining sampled tables in a database system as is described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1:
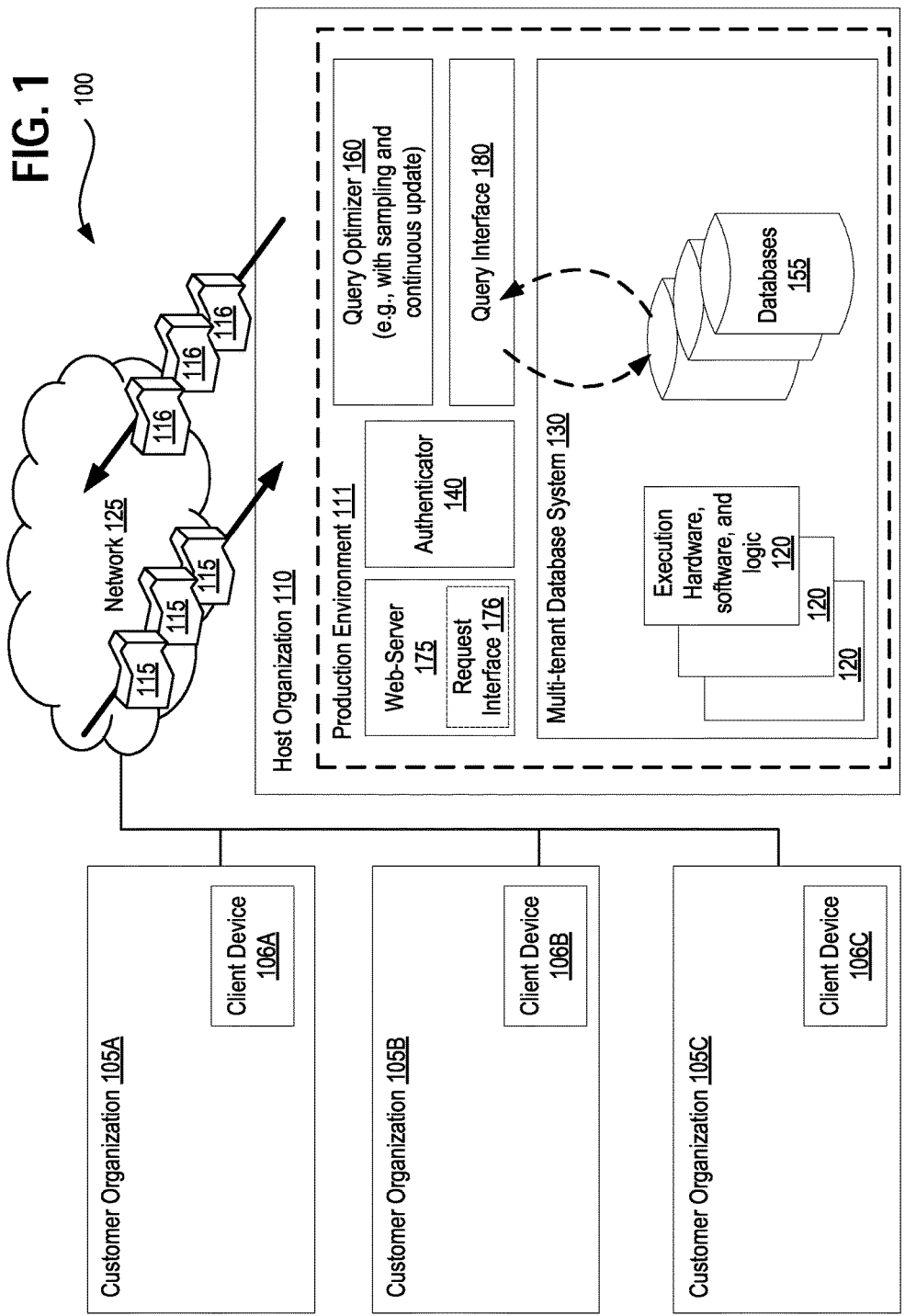
FIG. 1 depicts an exemplary architecture in accordance with described embodiments.

Described herein are systems and methods for implementing and maintaining sampled tables in a database system. An exemplary system may include, for example: a processor and a memory to execute instructions at the system; a database to store database records; a query interface to submit queries to the database and receive results from the database; triggers to initiate a hash function on database insert transactions, the hash function to hash a primary key of each database record to be inserted into the database to determine whether a first hash value of the primary key of the database record to be inserted satisfies a sampling condition; a sample table to store a sample record corresponding to any database record to be inserted into the database which satisfies the sampling condition based on the hash function; a primary key index providing a first index of the primary keys of the sample records stored in the sample table; and an ordered hash index providing a second index on a second hash value corresponding to a second hash of the primary key of the sample records stored in the sample table ordered numerically by the second hash value.

Certain embodiments operate within a hosted computing environment, also referred to as a provider of on-demand services, on-demand database services, cloud computing services, or simply a host organization that provides services to subscribing customer organizations. Such host organizations utilize various technologies to service many different tenants (e.g., customer organizations and their users) simultaneously. Such technologies may include, for example, client-server implementations, computing grids, computing pods or pools of work machines, traditional databases, single tenancy database systems and/or multi-tenant database systems. A multi-tenant database system in particular operates to store data on behalf of a multitude of subscribers, each being a "tenant" of the database system, hence the term multi-tenant database system. Many subscribers (e.g., users or tenants) utilize the computing technologies of the host organization to access analytics, charts, views, reports, and other such data which is stored within the servers, systems, databases, and multi-tenant database system of the host organization. For instance, a sales team may utilize sales data stored within such a system.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 in accordance with described embodiments. In one embodiment, a production environment 111 is communicably interfaced with a plurality of client devices 106A-C (e.g., such as mobile devices, smart phones, tablets, PCs, etc.) through host organization 110. In one embodiment, a multi-tenant database system 130 includes databases 155, for example, to store tables, datasets, and underlying database records with user data on behalf of customer organizations 105A-C (e.g., tenants of the multi-tenant database system 130 or their affiliated users). In alternative embodiments, a client-server computing architecture may be utilized in place of the multi-tenant database system 130, or a computing grid, or a pool of work servers, or some combination of hosted computing architectures to carry out the computational workload and processing demanded of the host organization 110.

The multi-tenant database system 130 depicted in the embodiment shown includes a plurality of underlying hardware, software, and logic elements 120 that implement database functionality and a code execution environment within the host organization 110. In accordance with one embodiment, multi-tenant database system 130 further implements databases 155 to service database queries and other data interactions with the databases 155. The hardware, software, and logic elements 120 of the multi-tenant database system 130 are separate and distinct from a plurality of customer organizations (105A, 105B, and 105C) which utilize the services provided by the host organization 110 by communicably interfacing to the host organization 110 via network 125. In such a way, host organization 110 may implement on-demand services, on-demand database services or cloud computing services to subscribing customer organizations 105A-C.

Host organization 110 receives input and other requests 115 from a plurality of customer organizations 105A-C via network 125 (such as a public Internet). For example, incoming database queries, API requests, interactions with displayed graphical user interfaces and displays at the client devices 106A-C, or other inputs may be received from the customer organizations 105A-C to be processed against the multi-tenant database system 130 as queries or queries may be constructed from the inputs 115 for execution against the databases 155 by the query optimizer 160 and/or the query interface 180, pursuant to which results 116 are then returned to an originator or requestor, such as a user of one of a client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its multi-tenant database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user client device 106A-C or machine originating such data requests 115.

Host organization 110 may implement a request interface 176 via web-server 175 or as a stand-alone interface to receive requests packets or other requests 115 from the client devices 106A-C. Request interface 176 further supports the return of response packets or other replies and responses 116 in an outgoing direction from host organization 110 to the client devices 106A-C.

Authenticator 140 operates on behalf of the host organization to verify, authenticate, and otherwise credential users attempting to gain access to the host organization.

Query interface 180 provides functionality to pass queries from web-server 175 into the multi-tenant database system 130 for execution against the databases 155 or other data stores of the host organization's production environment 111. In one embodiment, the query interface 180 implements an Application Programming Interface (API) through which queries may be executed against the databases 155 or other data stores.

Query optimizer 160 (e.g., with sampling and continuous update) performs query translation and optimization, for instance, on behalf of other functionality such as functionality of a graphical interface which possesses sufficient information to architect a query yet lacks the necessary logic to actually construct the appropriate query syntax. In other instances, query optimizer 160 modifies a submitted query to optimize its execution within the host organization without affecting the resulting dataset returned responsive to such an optimized query. In some embodiments queries are passed into the query interface 180 (e.g., from a customer organization, API, or GUI, Application, or other logic) and the query optimizer 160 intervenes to optimize the query prior to the query interface 180 executing the query against the databases 155 of the host organization 110. Query optimizer 160 implements the means to maintain sampled tables of the databases 155 of the host organization such that they do not become stale and out of date overtime as the underlying data that is sampled changes through organic updates, inserts, and deletions.

Figure 2:
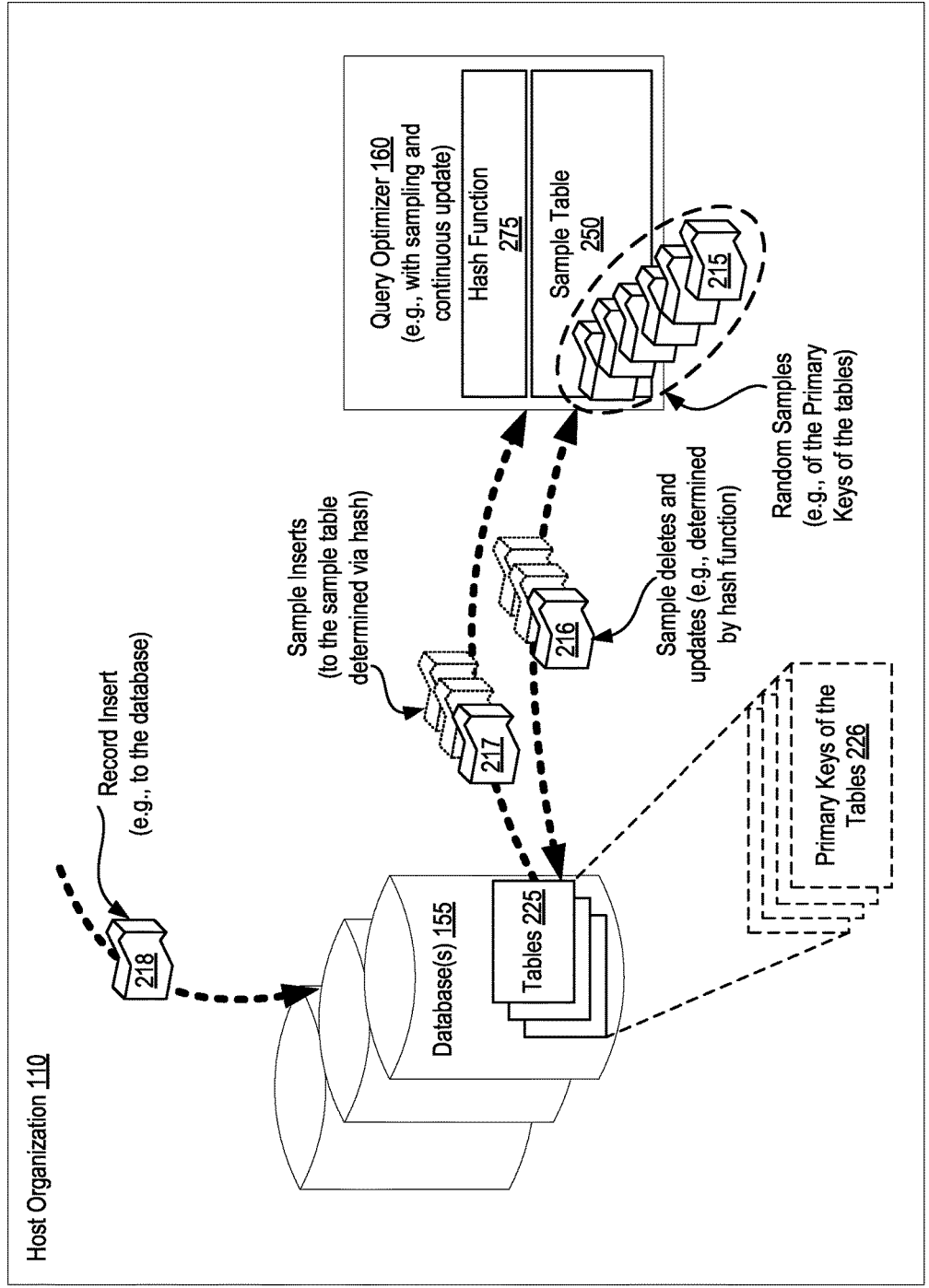
FIG. 2 depicts interactions of the query optimizer from FIG. 1 in additional detail.

FIG. 2 depicts interactions of the query optimizer 160 from FIG. 1 in additional detail. The host organization 110 and its database(s) 155 are again shown here, along with the query optimizer 160, however, additional detail is now provided including a sample table 250 which includes and continuously maintains random samples 215 of the primary keys 226 from every table 225 in the databases 155. As depicted, sample inserts 217 are provided to the sample table, for instance, pursuant to a hash function 275 which hashes the primary key of a database record corresponding to the inserts to determine whether or not a particular row is randomly sampled for insertion and maintenance by the sample table 250. Further depicted are sample deletes and updates 216 as determined by a hash function 275 so as to keep the sample table 250 continuously up to date when changes or deletions are committed to the tables 225 of the database 155.

Out of view of the users of the host organization the query optimizer maintains the sample table 250 and its random samples 215 such that when a query is to be performed on behalf of a user, it may be optimized by the query optimizer 160 based in the information stored by the optimizer without inducing computational delay to the user or originator of the query as would be the case if runtime or on-the-fly type sampling were performed. Moreover, because the sample table 250 is maintained continuously, the problem of stale data, common to conventional solutions, is wholly eliminated.

For instance, anytime a record is inserted 218 into the database 155, hash function 275 hashes the key of the record being inserted 218 into the database to determine whether that record is to be sampled. If the record being inserted 218 is to be sampled according to the hash function 275, then the primary key of that record being inserted 218 is taken as a sample insert 217 and correspondingly inserted to the sample table 250 maintained by the query optimizer 160. For instance, when the record being inserted 218 to the database 155 is committed, the primary key is commensurately inserted and committed to the sample table 250.

It is not necessary to maintain the full population of records being inserted 218 into the databases 155 as a sample, as this information is readily available from the databases 155 themselves. Rather, an appropriate sample of the population is maintained sufficient to yield the statistics and sample metrics utilized by the query optimizer 160. For instance, a one percent (1.0%) sample may be maintained in the sample table 250 pursuant to the configuration of the query optimizer 160. Other sample sizes may be utilized however, and the sample size may additionally be configurable by, for example, a database or system administrator. For example, the sample size may be configured as one percent for tables above a particular threshold size of records, such as tables having greater than 5,000 records total, or be configured as a greater percentage, such as 5% for tables having less than 5,000 total records. These numbers are merely exemplary and other sample sizes may be configured at the discretion of the system implementers or the database and system administrators. In a particular embodiment, a default 1% sample size is utilized for all tables unless and until configured specifically to a different sample size.

The hash function 275 is an algorithm that maps the primary key of the record being inserted 218, to another value, called a hash value, hash code, hash sum, checksum, or simply a "hash." The hash function 275 is deterministic such that it may be used initially to generate the hash value on the record being inserted 218, but then if subsequently executed again against the same primary key of the record previously inserted, the hash function 275 will again produce the same value. Because the hash function 275 returns the same hash value every time it is executed against a particular primary key, it is possible to both sample records being inserted 218 into the database 155 when the primary keys are new, but then again refer back to the same corresponding record in the sample table, or determine whether or not a record should exist in the sample table, in the event that identical primary key is referenced in the future. Therefore, if the record in the database 155 is updated or deleted, the hash function 275 using the primary key quickly determines whether or not a corresponding record exists in the sample table 250, and if so, the corresponding record in the sample table may thus be correspondingly updated or deleted as appropriate based on the action taken and committed to the record in the database 155. If on the other hand, the hash function 275 determines that a record was not sampled, then no further action is necessary as no corresponding record exists within the sample table 250.

According to certain embodiments, the hash function 275 operates to determine whether or not a record being inserted 218 into the database 155 meets the sample criteria (e.g., sampling condition, sampling threshold, sampling rate, sampling mode, etc.) based on generating a hash of the primary key of the record being inserted 218 and determining whether the numeric value produced by the hash function falls within a range of possible values that are to be sampled. For instance, given the range of possible values that may be produced by the hash function 275, if the sample size is 1%, then the smallest 1% of that range may be taken as the sample. Alternatively, if the sample size is 2% or 5% or some other size, then the smallest 2% or 5% or other percentage of the range may be taken as the sample. Similarly, the greatest percentage corresponding to the sample size may be selected, or some other systematic sampling of the resulting range of possible values that the hash function 275 may produce.

In another embodiment, rather than taking a lowermost or uppermost portion of a range of possible values of the hash function 275, a mod function may be applied to the resulting hash value produced by hashing the primary key to determine whether or not the record being inserted 218 into the database 155 will be sampled and correspondingly inserted into the sample table 250. For instance, for a 1% exemplary sample size, the mod function may divide the output of the hash function by 100, and if the remainder of the division is zero, then the record is sampled, whereas if the remainder is anything other than zero, which statistically should occur 99% of the time in this example, then the record is not sampled, thus resulting in a 1% sampling of the records being inserted 218 into the database 155.

According to described embodiments, a random sample 215 is taken of the primary key of every table 225 in the database or databases 155 of the host organization, and in such a way, the query optimizer 160 is able to perform query optimization on incoming queries without inducing latency and without having to rely upon stale or inaccurate data due to samples that are not up to date and may thus no longer reflect the state of information stored within the underlying database 155. The query optimizer 160 is able to perform such optimization no matter if the filter criteria of the query is commonly utilized or very infrequently utilized.

Conventionally available solutions suffer from two critical problems. With on-the-fly sampling on behalf of incoming queries, conventional solutions perform additional sample queries at runtime, before executing the query being requested, for instance, by carrying out a small query sample of relevant tables when the query to be optimized arrives. Such an approach may save some computational load in certain instances, however, because it occurs at runtime for the query being optimized (e.g., not in advance of receiving the query to be optimized) some delay is necessarily induced before querying for and returning the result set requested by the query being optimized. Such delay is perceived as latency, and as such, may result in less than optimal performance from the perspective of a customer or user. While large queries may be expected to take some processing time, small restrictive queries are expected to return very quickly, but would appear to hang or stall temporarily using the conventional on-the-fly sampling approach.

Another conventional approach is to periodically perform pre-queries of certain tables. With pre-queries, various samples are executed in advance to collect information reflecting selectivity to aid the query optimizer, even for those columns of tables that are not indexed, however, this approach likewise induces a critical problem for the query optimizer. Specifically, the pre-queries are only good at the moment that they are conducted, yet, the pre-query results may not be utilized by the query optimizer until some time later, during which time the underlying information of the sampled tables continues to change. Because of this mismatch in time between when the pre-queries are conducted and the time that they are consumed, the information utilized by the query optimizer is necessarily out of date, and may possibly no longer reflect an appropriate query optimization strategy. For example, range scans and pre-queries of the most commonly utilized tables may count how many rows exist within the tables and possibly identify commonly utilized filters which had a corresponding selectivity estimate. But these estimates and counts are only correct at the time they are conducted and then degrade over time until they are refreshed, potentially inducing unwarranted computational overhead into the systems of the host organization and very likely resulting in less than optimal query optimization strategies due to consumption of out of date information.

Figure 3:
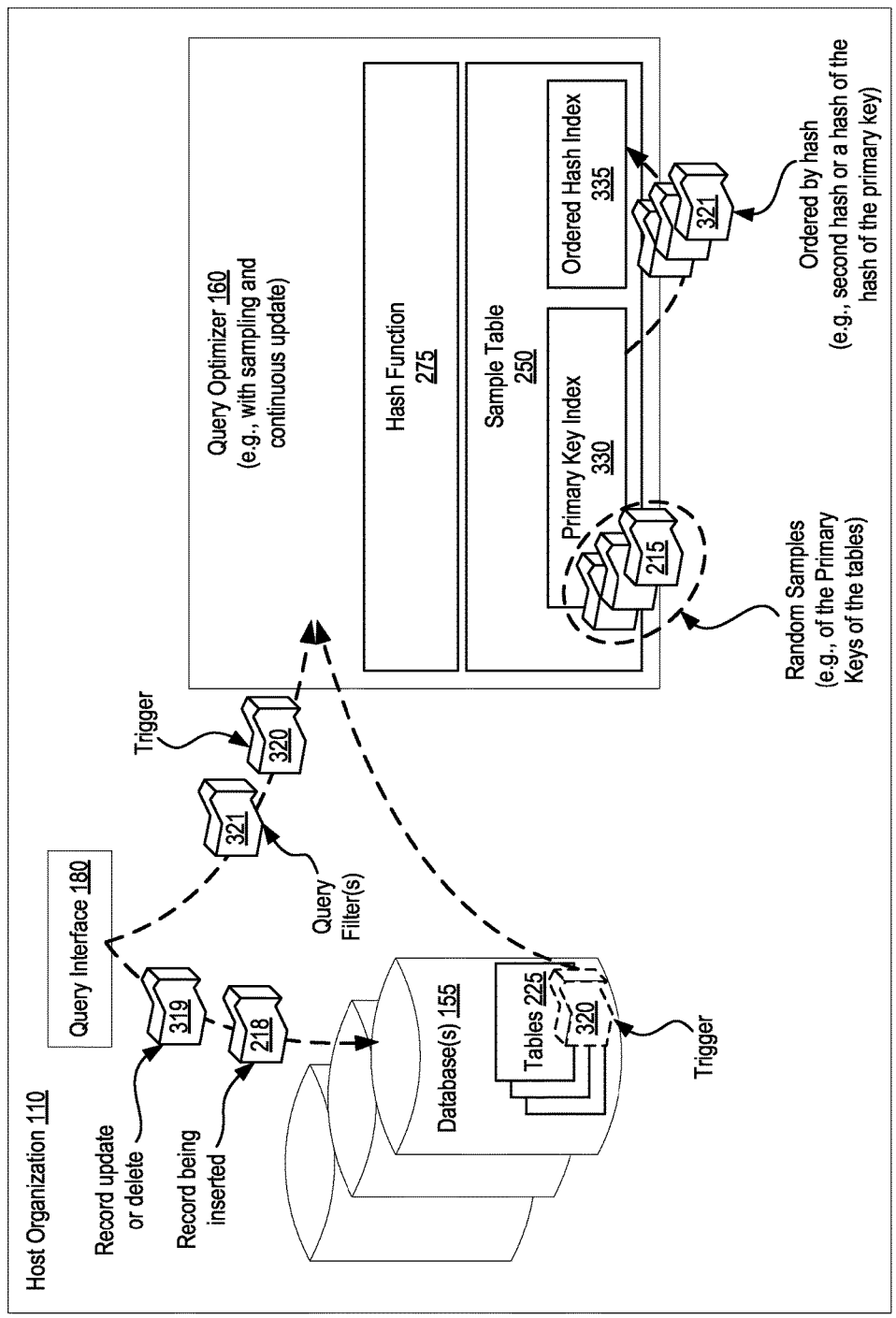
FIG. 3 depicts interactions of the query optimizer from FIGS. 1 and 2 in still further detail.

FIG. 3 depicts interactions of the query optimizer 160 from FIGS. 1 and 2 in still further detail. The host organization 110 and its database(s) 155 are again shown here, along with the query optimizer 160, however, still further detail is now provided showing the indices of the sample table 250 as maintained by the query optimizer 160, in particular, the primary index 330 and the ordered hash index 335, each within the sample table 250. Additionally depicted is the query interface 180 from FIG. 1, shown here as sending records to be inserted 218 and record updates or deletes 319 to the databases 155 of the host organization with a corresponding trigger 320 passed to into to query optimizer 160. In alternative embodiments, the trigger 320 is embodied within the tables 225 of the database 155 and when a database transaction attempts to insert a database record or delete a database record the trigger 320 within the corresponding table of the database 155 will cause the hash function 275 to hash the primary key to determine whether a record being inserted is to be sampled according to the sample criteria or if a record being deleted from the database 155 should also be deleted from the sample table 250 due to its having previously been sampled.

The primary key index 330 of the sample table stores a record corresponding to every sampled record being inserted 218 into the database 155 as previously described. The primary key index 330, is indexed by the hash value for each sampled record stored and maintained within the sample table so that it may be referenced again in the future by re-hashing the primary key of the record being inserted 218 into the database, thus producing the identical hash value again, which may then be looked in the sample table 250 via the primary key index 330.

The sample table 250 additionally includes the ordered hash index 335 which is ordered by another hash function of the hashed values stored within the sample table, thus, the ordered hash index 335 provides an index which is ordered by a subsequent hash of the initial hash result. The second index, the ordered hash index 335, is utilized to provide a randomized (a mathematically pseudo random) sampling of the records being inserted 218 into the database 155 with an even distribution. Because the distribution is made even through the hashing of the hash as stored by the ordered hash index 335, it is then possible to retrieve an even smaller sampling from the sample table and maintain a statistically appropriate representation, whereas, in the absence of the even distribution, the results may be skewed. Thus, take for example the sample table 250 having an exemplary 1000 records for a particular table. The ordered hash index 335 enables a statically representative sample to be maintained when less than all 1000 records are retrieved, for instance, if only the first 100 of the 1000 records are retrieved from the ordered hash index 335. Because the ordered hash index 335 reflects an even distribution due to ordering the records by a second hash of the initial hash of the primary key, the sample will not be erroneously skewed, as may be the case if the first 100 records were instead pulled from the primary key index 330.

In such a way, the ordering of the subsequent hash values of the initially hashed primary keys enables the use and sampling of data sets smaller than an exemplary 1% sample size sampled from the database 155. Therefore, if the query optimizer seeks a particular quantity of records it may do so, without having to use the entire 1% population as represented by the primary key index 330. Take the case where a 1% sample of a 100 million record table results in a sample size of 1 million hashed primary keys stored in the sample table. While 1 million is far fewer than the original dataset stored in the database 155, it will nevertheless be a computationally and time consuming endeavor to process the 1 million row sample. With a conventional database index, if the first exemplary 100 rows were taken as a sample, then the 100 rows returned would tend to be correlated in some way, and would not represent an even distribution across the full population. Similarly, in the primary key index 330, the first 100 exemplary rows will likewise be correlated in some way, despite them being represented by a hash value of the primary key for a corresponding record in the database 155. For instance, the first 100 rows for a table 225 represented in the primary key index 330 of the sample table may be from the first group of records initially inserted 218 into the database 155, thus resulting in their being sampled first, and thus inserted into the sample table 250 first, and listed by the primary key index 330 first. Such correlation would therefore cause the exemplary first 100 rows to return a skewed representation of the population.

A more extreme example may be considered in which 10,000 records are inserted 218 as an initial bulk insert to the database 155, and subsequently another 90,000 records are slowly added over time due to organic growth of the corresponding table 225. If then, the first 100 records representative of the table 225 were pulled from the primary key index 330 intending to represent the full 100,000 total records, then the first 10,000 records would be very heavily over represented, and the latter 90,000 subsequent records underrepresented. However, if a sampling of the first 100 records representative of the table 225 were pulled from the ordered hash index 335 intending to represent the full 100,000 total records, then the first 10,000 records would be as equally represented as the latter 90,000 records due to the even distribution within the ordered index due to the second hash function.

Other types of skew are likewise feasible and may be avoided through the use of the ordered hash index 335. For instance, querying the primary key index 330 instead of the ordered hash index 335 may return a sample that is skewed towards one side of the dataset along some dimension, such as the creation date of the rows, the primary key values, or even the physical storage location of the rows in the database. The re-shuffling effect of the second hash function provides the ability to access a precomputed sample set of an arbitrary size that is nevertheless representative of the full data set as stored by the database 155 with an appropriate distribution.

The second hash of the primary key solves problem of skew by re-shuffling the records which are ordered on their hash value returned by the second hash of the primary key (e.g., in which the hash function is performed a second time to output a second hash value), thus yielding an even distribution in the ordered hash index in which the second hash value is ordered numerically by the second hash value output from performing the hash function the second time. Accordingly, taking the first 100 rows from the ordered hash index 335 will provide an even and more statistically appropriate sampling of the underlying data in the database 155, even if the quantity of records stored in the sample table is much larger for any particular table 225 than what is retrieved as a record set from the sample table 250. For instance, taking the first 100 rows of 1 million available rows for a table 225 represented within the sample table 250 will cause the 100 rows to be selected at random across the total sampled population because the second hash of the primary key bears no relation whatsoever to the order in which such records are ordered via their primary keys in the primary key index 330 as initially introduced into the sample table 250 by the initial sampling of records being inserted 218 into the database 155.

The trigger 320 engages the query optimizer 160 from the query interface 180 or from whatever entity is submitting a query for optimization. At runtime for any given query to be executed against the database 155, the table 225 being referenced within the database 155 will have filters 321 by which to narrow the data to be returned, for instance, by a particular column, etc. Thus, at run time for the query to be optimized, the query optimizer 160 having been notified by the trigger 320 will apply the filters 321 to the sample table 250 which will return a much smaller number of rows than applying the equivalent filter 321 to the tables 225 of the database 155. For instance, the query optimizer 160 may query the sample table 250 using the filters 321 and receive back the full dataset from the sample table 250 or may query the sample table 250 using the filters 321 and specify a threshold quantity of rows to be returned, such as a maximum of 100 rows, etc.

Regardless, the dataset returned from the sample table 250 based on the filters 321 applied will provide an estimate of selectivity of the various filters 321 as they pertain to the entire population of records in the database 155 based on how many records match each of the respective filters 321 as returned by the sample table 250.

The query optimizer 160 may then seek out the most selective filter 321 according to the results returned from the sample table 250. For instance, the query optimizer 160 may select the filter 321 causing the fewest number of records to be returned from the sample table 250, indicating the greatest selectivity for that particular filter 321 because the same filter 321 should correspondingly return the tightest, smallest, and most restrictive set of records when the query is executed against the database 155. A filter that returns zero (0) records from the sample table 250 may be considered the most selective and restrictive filter 321 because while no results are yielded from the sample table 250, there may nevertheless be results returned from the database 155 via the same filter 321, but in a lesser quantity than another filter 321 which returns a greater quantity of records from the sample table 250 than the zero records result. The identified filter 321 may then be utilized to direct a query plan of the query optimizer 160 or provide optimization "hints" to a query optimizer 160.

As indicated previously, conventional solutions which perform pre-queries and then store the data suffer from a critical fault insomuch that the data they collect becomes stale over time, and as such, conventional query optimizers may fail to yield the optimal query optimization strategy due to their reliance upon out of date information. It is highly desirable for the query optimization strategies implemented to be stable such that query optimization may be tuned and yield consistent performance. However, with the conventional solution, each time a periodic pre-query updates, a shift in the sample will occur due to the interval of time between updates, which may be days, weeks, or even months. When such a shift occurs, it may in turn cause a conventional query optimizer to flip a variety of parameters, leading to unstable performance and instability in the query optimization strategies. Such instability generally leads to customer dissatisfaction and customer complaints.

Conversely, query optimizer 160 continuously keeps its sample table 250 up to date and as such, query optimizations based on the sample table 250 yield a query optimization strategy reflective of the current state of the database 155 as represented by the continuously up to date sample table 250 without large shifts in the sample and resulting query optimization strategies. With the ordered hash index 335 having the second hash of the initially hashed primary keys, querying for 100 rows in like manner between queries will generally return the same 100 rows each time, without a major re-shuffling as would be the case with conventional solutions. Such stability increases customer satisfaction, smoothes query performance, and increases tunability of the query optimizer 160 itself. Newly inserted tables may be represented within the even statistical distribution of the ordered hash index 335, but a completely new shuffling and new record set will not occur as may be the case with conventional solutions.

According to the described embodiments, received queries are subjected to query optimization via the query optimizer 160 regardless of the originating entity (e.g., from users directly, from APIs, GUIs, Applications, etc.). In certain embodiments, the query optimizer 160 attempts to utilize existing indices for the databases 155 first and then refers to the sample table 250 and its indices in the event that a received query specifies a column or filter for which there is no pre-existing index for the database 155. For instance, the sample table may be utilized as a fall back to optimize queries that may not otherwise be available for optimization due to an absence of database 155 indices for the particular table, column, or filter specified.

According to the described embodiments, triggers 320 enable the query optimizer 160 to continuously keep the sample table 250 up to date. According to one embodiment, triggers 320 are provided for all the tables 225 of the database 155 and inside of the trigger the hash function is called, instantiated, performed, or calculated, hashing the primary key for any record of the table 225 to return a hash value which is used on insert to determine whether or not to sample the record according to the configured sample rate or is used on updates and deletes to determine whether a record previously inserted was sampled and thus, requires a corresponding update or delete in the sample table 250. In some embodiments, only inserts and deletes are triggered 320 from the table 225 as no data exists within the sample table 250 which could be affected by an update, whereas in other embodiments the sample table 250 includes data that could be modified via an update to a record in the database 155, and as such, must be correspondingly updated in the sample table 250 when the hash function 275 indicates that such a record was previously sampled.

According to certain embodiments, when delete is committed to a table 225 of the database 155, the hash function determines if the record to be deleted was previously sampled and thus represented in the sample table 250, and if so, then on commit of the delete to the database 155, a delete of the corresponding record in the sample table 250 is committed to the sample table. In an alternative embodiment, when a delete is requested of the database 155, a soft delete is performed in which the record is updated and marked for deletion rather than having a delete committed to the database. In such an instance, trigger 320 initiates the hash function 275 as described previously to determine whether the record of the database 155 was previously sampled, and if so, the corresponding record in the sample table 250 is similarly updated as marked for deletion rather than being removed by committing the delete to the sample table 250.

The soft delete thus provides a mechanism by which a record requested for deletion may be restored or removed from the trash as it were, for at least a period of time. Such a function of the database 155 thus has corresponding support within the sample table without becoming out of sync should a record marked for deletion be later restored to the database 155.

According to certain embodiments, a copy of the corresponding record from the database 155 is maintained in the sample table. In other embodiments, the primary key of the corresponding record from the database 155 is maintained within the sample table 250 but not the remaining columns, such that a join may be performed to bring the record of the sample table 250 back together with the remaining columns of the corresponding record of the database 155. In such an embodiment, the hashed value of the primary key is additionally maintained in the sample table 250 via the ordered hash index 335 which orders the numerical listing of the hashed value of the primary keys of the sample records by their hashed value rather than by the value of the primary key as is done in the primary key index 330.

According to certain embodiments, the databases 155 operate within a multi-tenant database system which supports many distinct customer organizations as tenants of the multi-tenant database system. In such an embodiment, records of distinct tenants may be represented within a single sample table 250, and as such, an Organization ID or OrgID is additionally maintained within the sample table to ensure that rights and restrictions applied to the various customer organizations are correctly adhered to by the samples stored within the sample table 250. According to one embodiment, every row of the sample table 250 is identified by customer organization (e.g., via OrgID) and the indices (e.g., primary key index 330 and ordered hash index 335), as well as indices of the database 155, lead with OrgID, resulting in virtual tables on a per-OrgID basis, despite all records for all customer organizations actually residing within a single sample table 250.

According to one embodiment, when the sample table 250 is accessed it is accessed via an index only access and scanned for a subset or portion of the index corresponding to a particular customer organization based on an OrgID prefix.

According to one embodiment, a single monolithic sample table 250 is utilized for all samples taken from any table 225 of the database 155. In other embodiments, multiple sample tables 250 are utilized based on, for example, total records count, size on disk, customer organization ID, or other criteria.

According to another embodiment, when large jobs are presented to the database 155 for processing, it is feasible to break them into chunks corresponding to ranges of the primary keys. By breaking the jobs into chunks, it is possible to re-start a smaller sub-set of the total processing if a particular record fails to update properly. For instance, one of several chunks may be re-started rather than having to re-start the entire large job corresponding to all records. Unfortunately, the process of determining the ranges of primary keys by which to break up a large job is in of itself a computationally expensive task, yet is considered to be 100% overhead as the process of breaking up a job to be processed does not actually result in any portion of the job being processed. Breaking up the job is computationally expensive because with conventional solutions, it is necessary to scan all of the primary keys of the large job to create, for example, fence posts or range markers every so often, such as every 1000 records. It is not possible to simply jump every 1000 records or so and identify the range markers, but rather, it is necessary to actually perform a complete scan of all the keys such that the first 1000 records may be identified, and the second 1000 records, and so forth. The process of scanning every single primary key of a large processing job in of itself consumes valuable processing capacity and increases in a linearly as the size of the processing job increase.

Use of the sample table 250 via the query optimizer 160 functionality as described herein may be utilized to lessen the computational burden of breaking a large job into smaller chunks, while attaining the same objectives.

According to a particular embodiment, the primary key index 330 having the hashed values of the primary keys (not the second hash as represented by the ordered hash index 335) is scanned and the fence posts or range markers for breaking up the large processing job are taken from the primary key index 330 of the sample table rather than scanning the primary key of every record in the record set for the large processing job. Accordingly, identifying the fence posts or range markers consumes only approximately 1% of the total processing burden where a 1% sample size is utilized versus the conventional method. Therefore, if every 1000th primary key is desired to break up the large processing job, then with a 1% sample size, every 10th primary key may be taken from the primary key index 330 and used as the fence post or range marker. If every 10,000th key is desired, then every 100th key may be taken from the primary key index 330 of the sample table 250 with a 1% sample size, and so on.

Unlike the conventional method where a full scan of all primary keys and the taking of every exemplary 1000th primary key would result in perfectly even chunk sizes of exactly 1000 records each, using the primary key index 330 of the sample table will yield slightly uneven results with some chunks having slightly fewer and some chunks having slightly more than 1000 records due to the statistical variance in the sampling (e.g., a 1% sample does not mean that every 100th record is sampled, but rather, that statistically a 1% sample is taken for the population as a whole). Nevertheless, for the sake of chunking larger processing jobs into smaller portions, the unevenness of the sample is of no concern as the benefit of re-starting a failed subset remains but without the large computational overhead burden of determining the fence posts or range markers for the chunks.

The primary key index 330 is used rather than the ordered hash index 335 because in this instance, a statistically appropriate distribution of the population as provided by the ordered hash index 335 is not desired, but rather, for the sake of chunking a large job and identifying fence posts or range markers, it is preferable to use the primary key index 330 which will reflect the desired records in the sequence in which they were inserted 218 into the database, thus providing fence posts or range markers that are in sequence.

For the sake of performing maintenance updates and deletes to the sample table 250, the primary key index 330 is also utilized rather than the ordered hash index 335 because the primary key index 330 is more efficient at identifying a record by its un-hashed form of the primary key due to the sequential listing in the primary key index 330 by primary key value rather than the ordered listing of the hashed value of the primary keys as is present within the ordered hash index 335 which effectively re-shuffles the listing of the sample records in the sample table to effectuate the even distribution.

In another embodiment, a query or processing job may require the scanning of an enormous set of records, say a table with 1 billion rows, where even scanning all primary keys in a 1% sample table 250 will be too computationally expensive. In such an embodiment, the first 10,000 rows may be taken from the ordered hash index 335 (having the hash of the primary keys ordered, and thus, providing a randomized and even distribution of the population via the 10,000 row sample). Because the ordered hash index 335 provides an even distribution over the sampled population, even a small subset of the total sample will nevertheless yield a statistically appropriate result without having to scan all the primary keys represented within the sample table 250, which in this example of 1 billion rows would result in ten million rows at a 1% sample size.

In an alternative embodiment, a two step chunking process is performed to determining the fence posts or range markers for the chunks using the sample table 250 when breaking a large processing job into smaller portions or chunks, but where more even chunk sizes are desired. Despite being a two step process, computational overhead will still be approximately 1% of the processing requirements required for a full scan of all primary keys of a large processing job, assuming a 1% sample size.

For instance, where N chunks are desired, the ordered hash index 335 may be scanned for the first C times N rows, and then the resulting dataset is sorted by the primary key for each row and then every Cth row is selected as the fence posts or range markers for the chunks for the large processing job. Such a two step process will yield chunks that may not be the same size, but have a more even size due to their selection from the randomized distribution provided by the ordered hash index 335 and still benefit from the improvements of computational efficiency.

According to another embodiment pre-queries which use wildcarding (e.g., WHERE name LIKE '% x %') may be improved through the use of the sample table 250. For instance, wild carding requires an index scan and counting of rows which is computationally inefficient because the database 155 does not know where to look within its indices due to the leading wild card. Therefore, wildcard queries are optimized by first scanning a subset of the ordered hash index 335, for example, taking 100 rows from the ordered hash index 335 and then determining how many rows match the filter to identify which filter results in the smallest and most restrictive dataset, before the full dataset of the database 155 is then queried using the selected filter based on the pre-query run against the ordered hash index 335.

The host organization maintains a variety of statistics for its databases 155, primarily for the benefit of the query optimizer 160, such as tracking how many rows each particular customer organization has in each table, statistics about data distributions for columns, statistics about which rows each user has access rights to view and query, and so forth. However, the gathering of such statistics may be performed more quickly, and thus in a more computationally efficient manner by utilizing the sample table 250 rather than the full data set of the databases 155. For instance, the SQL keyword "SAMPLE" may be utilized to find appropriate statistics, but rather than issuing the SQL keyword "SAMPLE" against the database 155, it is executed against the sample table, and in particular, executed using the ordered hash index 335, resulting in an overhead savings while at the same time yielding a statistically consistent sampling of the database 155. Stated differently, the SQL keyword "SAMPLE" is used to sample a sample as provided by the sample table 250 rather than sampling the complete dataset which would take significantly more time and processing resources and yield statistically similar results.

According to another embodiment a report preview mode in a user's GUI (Graphical User Interface) is enabled through use of the sample table 250. For instance, when a user is building a report definition in an application a feature is provided to show a pre-view of the type of results that are likely to be provided when the report is fully executed against the complete dataset of the database 155. The sample table 250 enables this process to be highly efficient and return pre-view results without significant latency which would make the feature undesirable to the users and without high computational costs which would make such a feature cost prohibitive to perform. Thus, such a report preview mode enables sample results to be returned to the GUI being built and edited by the user in a pre-view mode by executing queries against the ordered hash index 335 of the sample table 250 with a restriction on row count to further increase the speed of the results. For instance, such a query may be issued against the sample table with a row count restriction of, for example, 25 rows, causing the query to quickly seek the first 25 rows and then self-terminate regardless of the total quantity of results in the database 155 or even the total quantity of potential sample results in the sample table 250. Different row counts may be utilized, but restricting the row count permits the query to execute very quickly while at the same time providing a good representation to the user of the type of results that may be expected. Furthermore, because the results are for pre-view within a GUI, it is unnecessary to return a full set which may exceed the size of a GUI's viewing window even if all results were returned. It is possible, however, that no results will be returned when querying the sample table 250 if a selective filter is utilized, even where some results do exist within the database 155 itself. Nevertheless, the feature simply provides enhanced usability to users building report interfaces without negatively affecting eventual report results and further without incurring expensive computational burden by scanning through a potentially large number of records in the database 155.

Figure 4:
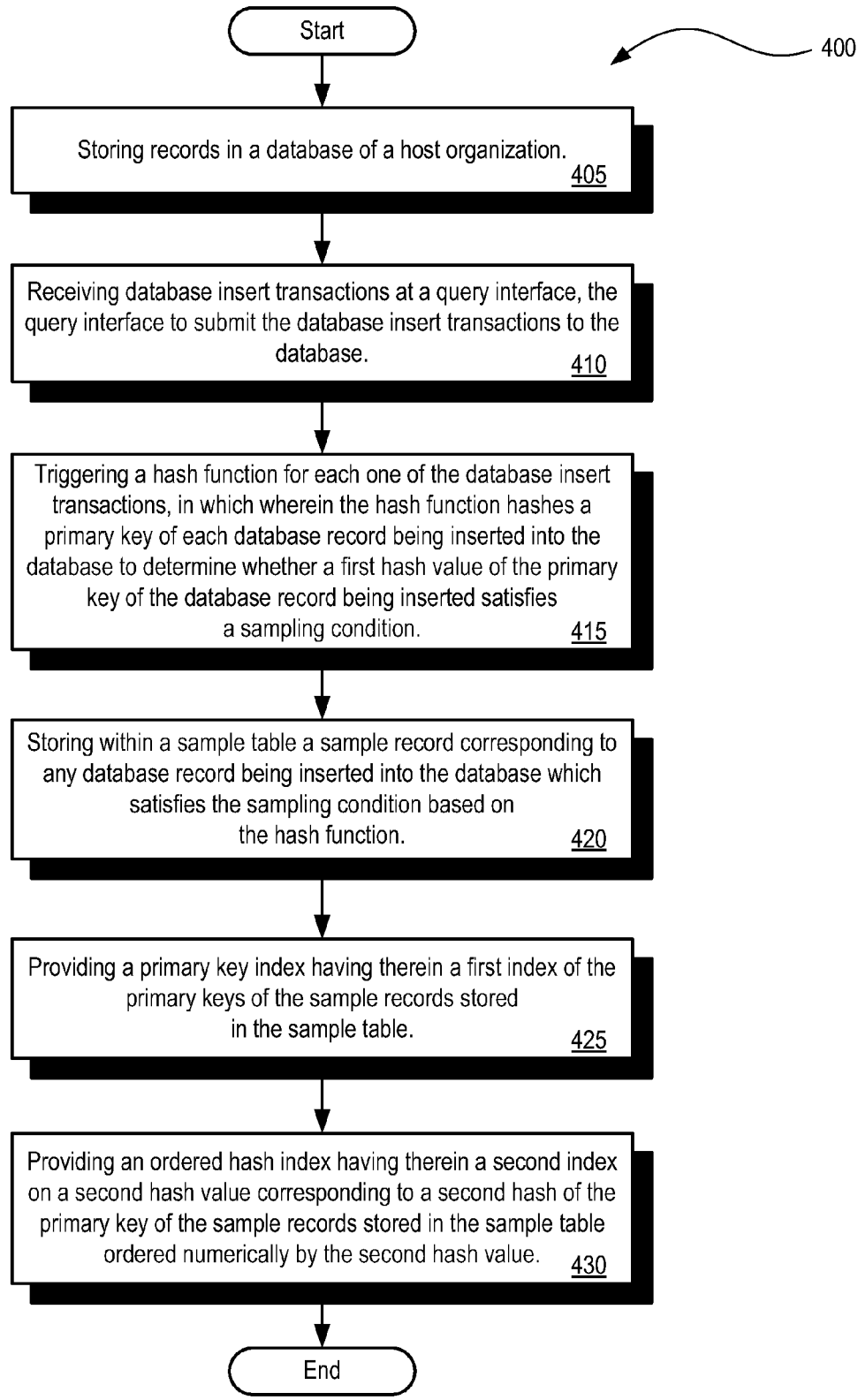
FIG. 4 is a flow diagram illustrating a method for implementing and maintaining sampled tables in a database system in accordance with disclosed embodiments.

FIG. 4 is a flow diagram illustrating a method 400 for implementing and maintaining sampled tables in a database system in accordance with disclosed embodiments. Method 400 may be performed by processing logic that may include hardware (e.g., circuitry, dedicated logic, programmable logic, microcode, etc.), software (e.g., instructions run on a processing device) to perform various operations such as storing records, processing transactions, executing, providing, determining, hashing, triggering, receiving, displaying, retrieving, communicating, updating, transmitting, sending, returning, etc., in pursuance of the systems and methods as described herein. For example, the computing architecture (e.g., within production environment 111) of host organization 110 as depicted at FIG. 1, the system 500 at FIG. 5, the environments 698 and 699 at FIGS. 6A and 6B respectively, or the machine 700 at FIG. 7, may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 405, processing logic stores records in a database of a host organization.

At block 410, processing logic receives database insert transactions at a query interface, the query interface to submit the database insert transactions to the database.

At block 415, processing logic triggers a hash function for each one of the database insert transactions, in which wherein the hash function hashes a primary key of each database record being inserted into the database to determine whether a first hash value of the primary key of the database record being inserted satisfies a sampling condition.

At block 420, processing logic stores within a sample table a sample record corresponding to any database record being inserted into the database which satisfies the sampling condition based on the hash function;

At block 425, processing logic provides primary key index having therein a first index of the primary keys of the sample records stored in the sample table; and At block 430, processing logic provides an ordered hash index having therein a second index on a second hash value corresponding to a second hash of the primary key of the sample records stored in the sample table ordered numerically by the second hash value.

According to another embodiment, method 400 further includes: initiating the hash function upon any database record delete transaction. According to such an embodiment, the hash function performs a hash of the primary key for a database record to be deleted pursuant to the database record delete transaction to determine whether the database record to be deleted satisfies the sampling condition indicating a sample record within the sample table must also be deleted or marked for deletion.

According to another embodiment of method 400, the hash function determines whether the database record to be inserted satisfies the sampling condition by performing the following operations: generating a hash of the primary key of the database record to be inserted; receiving the first hash value as a numeric value output from the hash function; determining whether the numeric value output by the hash function falls within a specified sampling range of all possible values for the numeric value output by the hash function; and inserting the hash of the primary key into the sample table when the numeric value output by the hash function is determined to fall within the specified sampling range or alternatively discarding the hash of the primary key without insertion into the sample table when the numeric value output by the hash function is determined to fall outside of the specified sampling range.

In accordance with a particular embodiment, there is non-transitory computer readable storage media having instructions stored thereon that, when executed by a processor of a system, the instructions cause the system to perform operations including: storing records in a database; receiving database insert transactions at a query interface, the query interface to submit the database insert transactions to the database; triggering a hash function for each one of the database insert transactions; wherein the hash function hashes a primary key of each database record being inserted into the database to determine whether a first hash value of the primary key of the database record being inserted satisfies a sampling condition; storing within a sample table a sample record corresponding to any database record being inserted into the database which satisfies the sampling condition based on the hash function; providing a primary key index having therein a first index of the primary keys of the sample records stored in the sample table; and providing an ordered hash index having therein a second index on a second hash value corresponding to a second hash of the primary key of the sample records stored in the sample table ordered numerically by the second hash value.

Figure 5:
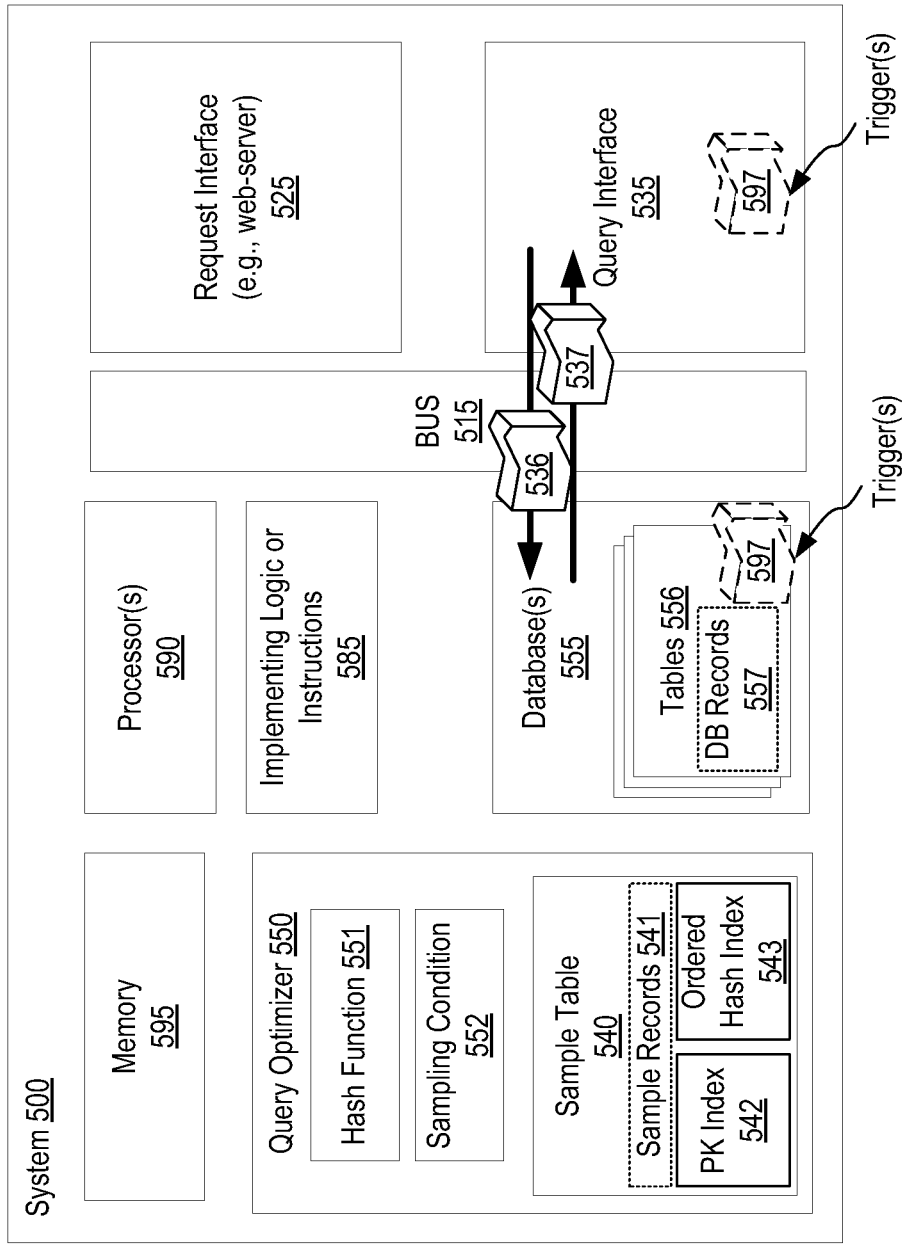
FIG. 5 shows a diagrammatic representation of a system in accordance with which embodiments may operate, be installed, integrated, or configured.

FIG. 5 shows a diagrammatic representation of a system 500 in which embodiments may operate, be installed, integrated, or configured.

In accordance with one embodiment, there is a system 500 having at least a processor 590 and a memory 595 therein to execute implementing logic and/or instructions 585. Such a system 500 may execute within a hosted computing environment, such as a host organization, a multi-tenant environment, an on-demand service provider, a cloud based service provider, a client-server environment, etc.

According to the depicted embodiment, the system 500 includes the processor 590 and the memory 595 to execute instructions at the system 500; a database 555 to store database records 557; a query interface 535 to submit queries 536 to the database 555 and receive results 537 (e.g., a results set) from the database 555; triggers 597 to initiate a hash function 551 on database insert transactions (e.g., database query 536), the hash function 551 to hash a primary key of each database record 557 to be inserted into the database 555 to determine whether a first hash value of the primary key of the database record 557 to be inserted satisfies a sampling condition 552; a sample table 540 to store a sample record 541 corresponding to any database record 557 to be inserted into the database which satisfies the sampling condition 552 based on the hash function 551; a primary key index 542 providing a first index of the primary keys of the sample records stored in the sample table; and an ordered hash index 543 providing a second index on a second hash value corresponding to a second hash of the primary key of the sample records 541 stored in the sample table 540 ordered numerically by the second hash value.

According to another embodiment of system 500, a query optimizer 550 implements the hash function 551. In an alternative embodiment, the hash function is implemented within the tables 556 of the database 555.

According to another embodiment, the system 500 further includes: a plurality of tables within the database 555, in which the database records are stored within the plurality of tables; and in which the triggers 597 that initiate the hash function on database insert transactions reside within the plurality of tables.

According to another embodiment of system 500, a hash function trigger resides within every table of the database, the hash function trigger operable to initiate the hash function upon any database insert transaction to the table within which the respective hash function trigger resides.

According to another embodiment of system 500, the hash function trigger is further configured to initiate the hash function upon any database record delete transaction for the table within which the respective hash function trigger resides; and in which the hash function triggered responsive to a database record delete transaction performs a hash of the primary key for a database record to be deleted pursuant to the database record delete transaction to determine whether the database record to be deleted satisfies the sampling condition indicating a sample record within the sample table must also be deleted or marked for deletion.

According to another embodiment of system 500, the queries to the database are processed through the query interface; and in which the triggers to initiate the hash function on database insert transactions reside within the query interface; and in which the query optimizer embodies the sample table, the hash primary key index of the sample table, the ordered hash index of the sample table, and implements the hash function.

According to another embodiment, the system 500 further includes: a query optimizer to perform query optimization on queries to be executed against the database; and in which the query optimizer embodies the sample table, the primary key index of the sample table, the ordered hash index of the sample table, and implements the hash function.

According to another embodiment of system 500, the sample condition includes a statistical sampling rate of the database records being stored in the database upon insertion.

According to another embodiment of system 500, the hash function is to determine whether the database record to be inserted satisfies the sampling condition includes logic of the hash function to: generate the first hash value of the primary key of the database record to be inserted; receive the first hash value as a numeric value output from the hash function; determine whether the numeric value output by the hash function falls within a specified sampling range of all possible values for the numeric value output by the hash function; and insert the primary key in its un-hashed form into the primary key index of the sample table and additionally insert the second hash value corresponding to the second hash of the primary key in its hashed form into the ordered hash index of the sample table when the numeric value output by the hash function is determined to fall within the specified sampling range or alternatively to discard the hash of the primary key without insertion into either the primary key index or the ordered hash index of the sample table when the numeric value output by the hash function is determined to fall outside of the specified sampling range.

According to another embodiment of system 500, the sampling condition includes sampling 1% of the of the database records being stored in the database upon insertion.

According to another embodiment of system 500, logic of the hash function is to: generate the first hash value of the primary key of the database record to be inserted; receive the first hash value as a numeric value output from the hash function; subject the numeric value output from the hash function to a mod function, the mod function to divide the numeric value output from the hash function by 100 and then determine whether the remainder of the division is zero; and insert the primary key in its un-hashed form into the primary key index of the sample table and additionally insert the second hash value corresponding to the second hash of the primary key in its hashed form into the ordered hash index of the sample table when the remainder of the division is zero or alternatively discard the hash of the primary key without insertion into either the primary key index or the ordered hash index of the sample table when the remainder of the division is not zero.

According to another embodiment of system 500, each sample record stored within the sample table includes at least: the primary key of the sample records stored in the sample table in its un-hashed form; and the second hash value corresponding to the hash of the primary key of the sample records stored in the sample table in its hashed form and ordered numerically by the value of the hash of the primary key; and a customer organization identifier (OrgID) identifying which customer organization amongst a plurality of customer organizations have ownership and authority for the sample record stored in the sample table and the corresponding database record stored in the database.

According to another embodiment of system 500, each sample record stored in the sample table includes one of: a copy of the corresponding database record in the database, including the primary key; or the primary key of the corresponding database record in the database but not any remaining columns of the corresponding database record, in which a join is performed via the primary key to bring the sample record stored in the sample table back together with the remaining columns of the corresponding database record in the database.

According to another embodiment, the system 500 further includes: a query optimizer to execute a query against the sample table, in which sample table is accessed via an index only access and scanned for a subset or a portion of the index corresponding to a specified customer organization based on an OrgID prefix maintained within an OrgID column and indexed within the sample table.

According to another embodiment, the system 500 further includes: a query optimizer to execute a query against the sample table to identify a plurality of range markers for a processing job having multiple database transactions specified therein which is to be broken down into a plurality of chunks, each corresponding to a non-overlapping sub-set of the processing job according to the plurality of range markers; and in which the query optimizer is to identify the plurality of range markers by issuing a query against the primary key index having therein the primary keys in their un-hashed form; in which the primary key index is scanned to identify a plurality of the primary keys to function as the range markers based on a specified interval quantity of rows; and in which scanning the primary key index negates having to scan all of the primary keys of the processing job to be broken down into the plurality of chunks.

According to another embodiment, the system 500 further includes: a query optimizer to optimize a database query having a leading wild card in a WHERE statement of an SQL query by scanning a subset of the ordered hash index and selecting a filter corresponding to a result set from the sample table having a smallest quantity of records returned; and in which the selected filter is then used as part of the database query to be optimized when executed against a full dataset of the database.

According to another embodiment, the system 500 further includes: a query optimizer to generate statistics for the database by issuing a query with the SQL command term SAMPLE against the ordered hash index of the sample table; and returning the result set from the query as a statistically consistent representation of a full dataset of the database.

According to another embodiment, the system 500 further includes: a query optimizer to issue a query for and return report preview results for a Graphical User Interface (GUI) by executing the query against the ordered hash index of the sample table using a filter specified by the GUI with a row number limit which restricts a maximum quantity of records returnable with the report preview results and which further terminates processing of the query when the row number limit is reached.

According to another embodiment of system 500, the database of the host organization is a multi-tenant database system implemented by the host organization and storing customer data on behalf of a plurality of separate and distinct customer organizations; and in which the sample table includes a relational database operated within the host organization to store the sample records without being directly accessible to any of the plurality of separate and distinct customer organizations which utilize the multi-tenant database system; and in which the sample table is indirectly accessible to the customer organizations through the query interface and a query optimizer of the system which performs query optimization on queries for execution against the multi-tenant database system.

According to another embodiment of system 500, each of the plurality of separate and distinct customer organizations which utilize the multi-tenant database system is an entity selected from the group consisting of: a separate and distinct remote organization, an organizational group within the host organization, a business partner of the host organization, or a customer organization that subscribes to cloud computing services provided by the host organization.

Bus 515 interfaces the various components of the system 500 amongst each other, with any other peripheral(s) of the system 500, and with external components such as external network elements, other machines, client devices, etc., including communicating with such external devices via a network interface over a LAN, WAN, or the public Internet. Query interface 535 provides functionality to pass queries from the request interface 525 (e.g., web-server) into a multi-tenant database system for execution against its databases or other data stores of the host organization's production environment as depicted in additional detail at FIG. 1.

Figure 6A:
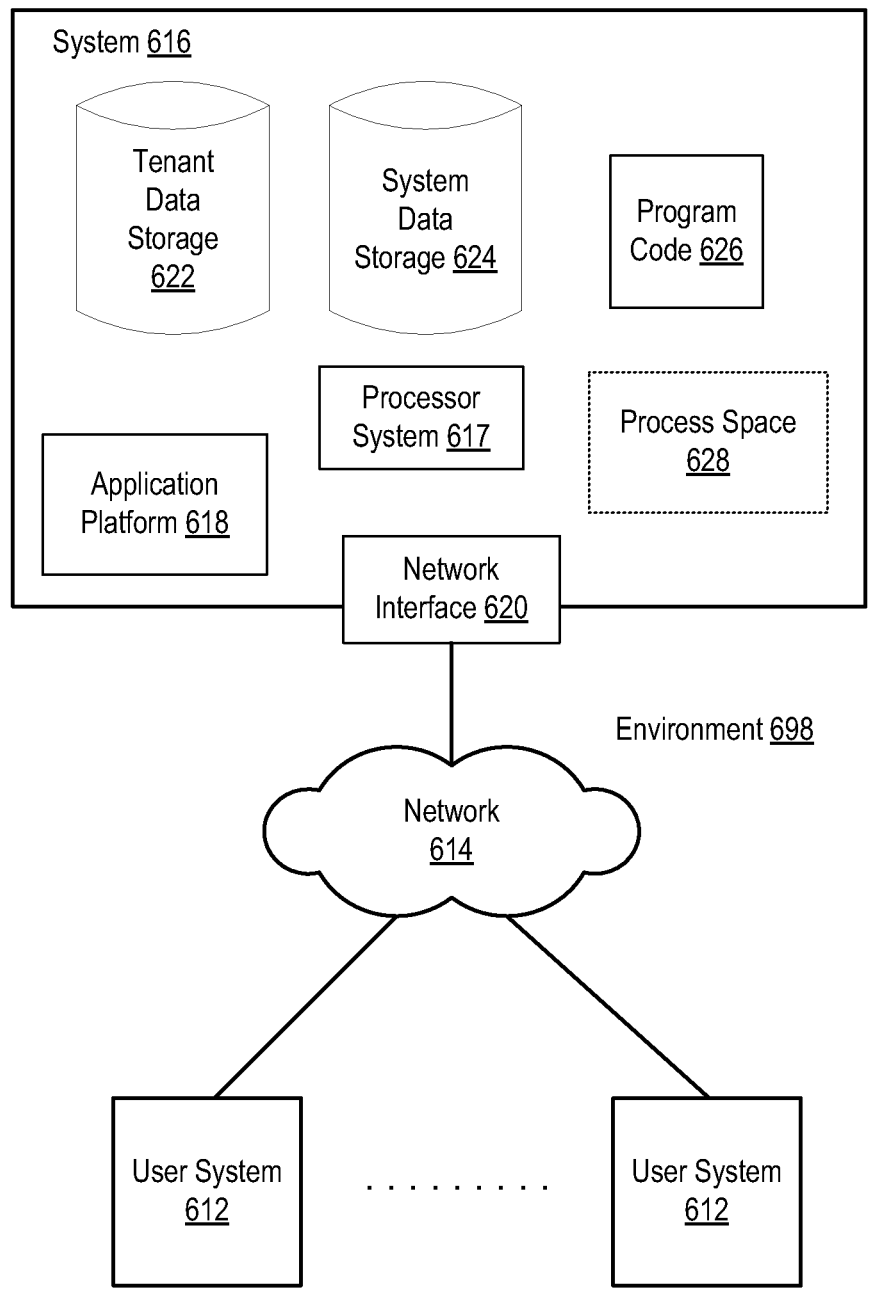
FIG. 6A illustrates a block diagram of an environment in which an on-demand database service may operate in accordance with the described embodiments.

FIG. 6A illustrates a block diagram of an environment 698 in which an on-demand database service may operate in accordance with the described embodiments. Environment 698 may include user systems 612, network 614, system 616, processor system 617, application platform 618, network interface 620, tenant data storage 622, system data storage 624, program code 626, and process space 628. In other embodiments, environment 698 may not have all of the components listed and/or may have other elements instead of, or in addition to, those listed above.

Environment 698 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6A (and in more detail in FIG. 6B) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" is used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6A, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6A, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6A include conventional, well-known elements that are explained only briefly here. For example, each user system 612 may include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6B:
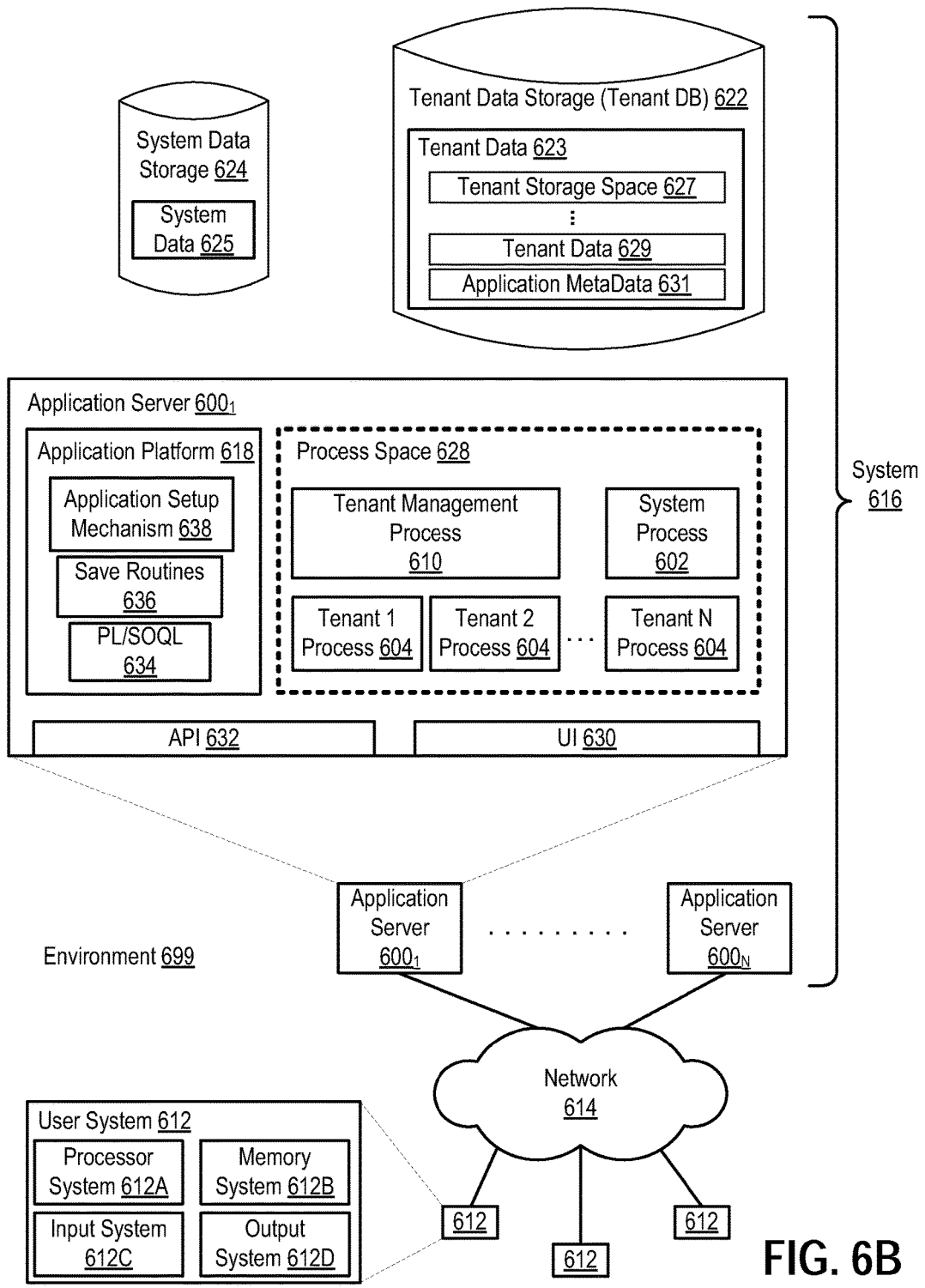
FIG. 6B illustrates another block diagram of an embodiment of elements of FIG. 6A and various possible interconnections between such elements in accordance with the described embodiments.

FIG. 6B illustrates another block diagram of an embodiment of elements of FIG. 6A and various possible interconnections between such elements in accordance with the described embodiments. FIG. 6B also illustrates environment 699. However, in FIG. 6B, the elements of system 616 and various interconnections in an embodiment are illustrated in further detail. More particularly, FIG. 6B shows that user system 612 may include a processor system 612A, memory system 612B, input system 612C, and output system 612D. FIG. 6B shows network 614 and system 616. FIG. 6B also shows that system 616 may include tenant data storage 622, having therein tenant data 623, which includes, for example, tenant storage space 627, tenant data 629, and application metadata 631. System data storage 624 is depicted as having therein system data 625. Further depicted within the expanded detail of application servers 600$_{1-N}$ are User Interface (UI) 630, Application Program Interface (API) 632, application platform 618 includes PL/SOQL 634, save routines 636, application setup mechanism 638, process space 628 includes system process space 602, tenant 1-N process spaces 604, and tenant management process space 610. In other embodiments, environment 699 may not have the same elements as those listed above and/or may have other elements instead of, or in addition to, those listed above.

User system 612, network 614, system 616, tenant data storage 622, and system data storage 624 were discussed above in FIG. 6A. As shown by FIG. 6B, system 616 may include a network interface 620 (of FIG. 6A) implemented as a set of HTTP application servers 600, an application platform 618, tenant data storage 622, and system data storage 624. Also shown is system process space 602, including individual tenant process spaces 604 and a tenant management process space 610. Each application server 600 may be configured to tenant data storage 622 and the tenant data 623 therein, and system data storage 624 and the system data 625 therein to serve requests of user systems 612. The tenant data 623 might be divided into individual tenant storage areas (e.g., tenant storage space 627), which can be either a physical arrangement and/or a logical arrangement of data. Within each tenant storage space 627, tenant data 629, and application metadata 631 might be similarly allocated for each user. For example, a copy of a user's most recently used (MRU) items might be stored to tenant data 629. Similarly, a copy of MRU items for an entire organization that is a tenant might be stored to tenant storage space 627. A UI 630 provides a user interface and an API 632 provides an application programmer interface into system 616 resident processes to users and/or developers at user systems 612. The tenant data and the system data may be stored in various databases, such as one or more Oracle™ databases.

Application platform 618 includes an application setup mechanism 638 that supports application developers' creation and management of applications, which may be saved as metadata into tenant data storage 622 by save routines 636 for execution by subscribers as one or more tenant process spaces 604 managed by tenant management process space 610 for example. Invocations to such applications may be coded using PL/SOQL 634 that provides a programming language style interface extension to API 632. Invocations to applications may be detected by one or more system processes, which manages retrieving application metadata 631 for the subscriber making the invocation and executing the metadata as an application in a virtual machine.

Each application server 600 may be communicably coupled to database systems, e.g., having access to system data 625 and tenant data 623, via a different network connection. For example, one application server 600$_1$ might be coupled via the network 614 (e.g., the Internet), another application server 600$_{N-1}$ might be coupled via a direct network link, and another application server 600$_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 612 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user may hit three different application servers 600, and three requests from different users may hit the same application server 600. In this manner, system 616 is multi-tenant, in which system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 600 to request and update system-level and tenant-level data from system 616 that may require sending one or more queries to tenant data storage 622 and/or system data storage 624. System 616 (e.g., an application server 600 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7:
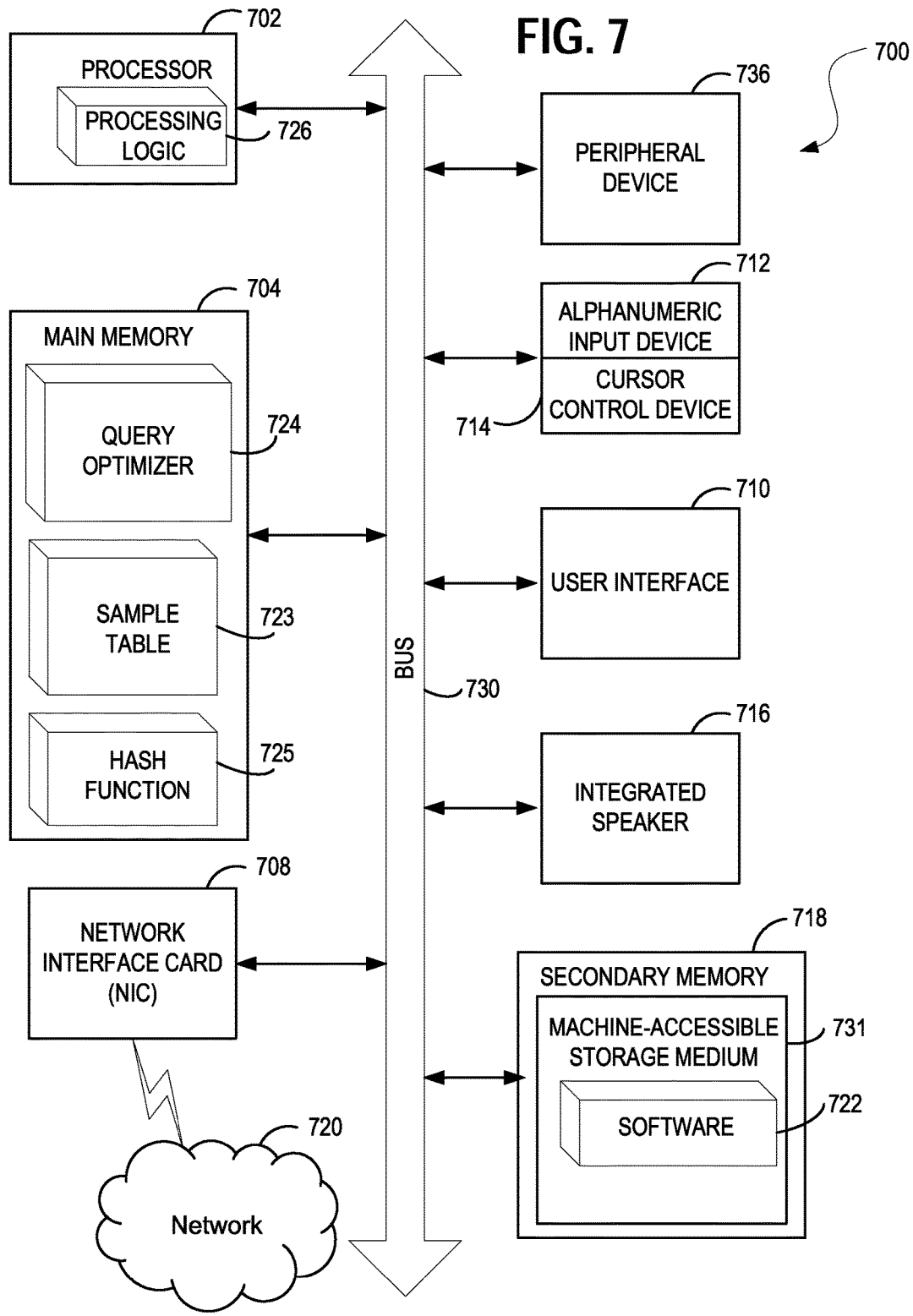
FIG. 7 illustrates a diagrammatic representation of a machine in the exemplary form of a computer system, in accordance with one embodiment.

FIG. 7 illustrates a diagrammatic representation of a machine 700 in the exemplary form of a computer system, in accordance with one embodiment, within which a set of instructions, for causing the machine/computer system 700 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and a persistent database and/or a multi-tenant database implementation), which communicate with each other via a bus 730. Main memory 704 includes a query optimizer 724 to implement the mechanisms described herein, such as sample table 723 to store sampled records and the hash function 725 to hash the primary key and return a first hash value and to further hash the first hash value corresponding to a hash of the primary key to produce a second hash value of the primary key. Main memory 704 and its sub-elements are operable in conjunction with processing logic 726 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include a network interface card 708. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.).

The secondary memory 718 may include a non-transitory machine-readable storage medium or a non-transitory computer readable storage medium or a non-transitory machine-accessible storage medium 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system to execute within a host organization, wherein the system comprises:
    a processor and a memory to execute instructions at the system;
    a query optimizer to optimize database queries;
    a database system having a plurality of database tables, each of the plurality of database tables to store database records, wherein each of the plurality of database tables embodies a trigger component, stored within the respective database table;
    wherein the trigger component embodied within each respective database table is to initiate a hash function of the primary key for the respective database table upon a database insert transaction of a new database record being inserted into the respective database table;
    a sample table within the query optimizer and maintained by the query optimizer separate from the plurality of database tables of the database system, wherein the sample table is to store a sample record corresponding to any database record being inserted into the respective database table of the database system which satisfies the sampling condition based on the hash function pursuant to the trigger component;
    wherein the trigger component of each respective database table continuously maintains sampled records in the sample table upon any insert, change, or deletion to records within the respective database table satisfying the sampling condition based on the hash function;
    wherein the hash function trigger is further configured to initiate the hash function upon any database record delete transaction for the table within which the respective hash function trigger resides and, responsive to a database record delete transaction, the hash function performs a hash of the primary key for a database record being deleted pursuant to the database record delete transaction to determine whether the database record being deleted satisfies the sampling condition indicating a sample record within the sample table must also be deleted or marked for deletion;
    a primary key index providing an index of the primary keys of the sample records stored in the sample table;
    a query interface to receive a query for the database system, wherein the queries to the database system are processed through the query interface and wherein the trigger component to initiate the hash function on database insert transactions resides within the query interface;
    wherein the query optimizer is to optimize the received query by applying a plurality of filters to the sample table and selecting one of the plurality of filters based on which one of the plurality of filters corresponds to a greatest reduction in a number of records returned from the sample table, and wherein the query interface is to pass the trigger component to the query optimizer to perform the hash function for each database record being inserted into the database system to determine whether the database record being inserted satisfies a sampling condition; and
    the query interface to execute the optimized query against the database system, wherein the optimized query applies the selected one of the plurality of filters to the database system in fulfillment of executing the received query.

2. The system of claim 1, further comprising:
    wherein executing the optimized query against the database system comprises
        executing the optimized query against at least one of the plurality of tables of the database system having the database records stored therein corresponding to the fewest number of records returned from the sample table during the optimizing of the received query.

3. The system of claim 2, wherein a hash function trigger resides within every table of the database system, the hash function trigger operable in conjunction with the query interface to initiate the hash function upon any database insert transaction to the table within which the respective hash function trigger resides.

4. The system of claim 1, wherein the hash function to determine whether the database record being inserted satisfies the sampling condition comprises logic of the hash function to:
generate the first hash value of the primary key of the database record being inserted;
receive the first hash value as a numeric value output from the hash function;
determine whether the numeric value output by the hash function falls within a specified sampling range of all possible values for the numeric value output by the hash function; and
insert the primary key in its un-hashed form into the primary key index of the sample table and additionally insert the second hash value corresponding to the second hash of the primary key in its hashed form into the ordered hash index of the sample table when the numeric value output by the hash function is determined to fall within the specified sampling range or alternatively to discard the hash of the primary key without insertion into either the primary key index or the ordered hash index of the sample table when the numeric value output by the hash function is determined to fall outside of the specified sampling range.

5. The system of claim 1, wherein each sample record stored within the sample table comprises at least:
the primary key of the sample records stored in the sample table in its un-hashed form; and
the second hash value corresponding to the hash of the primary key of the sample records stored in the sample table in its hashed form and ordered numerically by the value of the hash of the primary key; and
a customer organization identifier (OrgID) identifying which customer organization amongst a plurality of customer organizations have ownership and authority for the sample record stored in the sample table and the corresponding database record stored in the database system.

6. The system of claim 1, wherein each sample record stored in the sample table comprises one of:
a copy of the corresponding database record in the database system, including the primary key; or
the primary key of the corresponding database record in the database system but not any remaining columns of the corresponding database record, wherein a join is performed via the primary key to bring the sample record stored in the sample table back together with the remaining columns of the corresponding database record in the database system.

7. The system of claim 1, further comprising:
a query optimizer to execute a query against the sample table;
wherein sample table is accessed via an index only access and scanned for a subset or a portion of the index corresponding to a specified customer organization based on an OrgID prefix maintained within an OrgID column and indexed within the sample table.

8. The system of claim 1, further comprising:
a query optimizer to execute a query against the sample table to identify a plurality of range markers for a processing job having multiple database transactions specified therein which is being broken down into a plurality of chunks, each corresponding to a non-overlapping sub-set of the processing job according to the plurality of range markers; and
wherein the query optimizer is to identify the plurality of range markers by issuing a query against the primary key index having therein the primary keys in their un-hashed form;
wherein the primary key index is scanned to identify a plurality of the primary keys to function as the range markers based on a specified interval quantity of rows; and
wherein scanning the primary key index negates having to scan all of the primary keys of the processing job being broken down into the plurality of chunks.

9. The system of claim 1, further comprising:
a query optimizer to optimize a database query having a leading wild card in a WHERE statement of an SQL query by scanning a subset of the ordered hash index and selecting a filter corresponding to a result set from the sample table having a smallest quantity of records returned; and
wherein the selected filter is then used as part of the database query being optimized when executed against a full dataset of the database system.

10. The system of claim 1, further comprising:
a query optimizer to issue a query for and return report preview results for a Graphical User Interface (GUI) by executing the query against the ordered hash index of the sample table using a filter specified by the GUI with a row number limit which restricts a maximum quantity of records returnable with the report preview results and which further terminates processing of the query when the row number limit is reached.

11. The system of claim 1:
wherein the database system of the host organization comprises a multi-tenant database system implemented by the host organization and storing customer data on behalf of a plurality of separate and distinct customer organizations; and
wherein the sample table comprises a relational database operated within the host organization to store the sample records without being directly accessible to any of the plurality of separate and distinct customer organizations which utilize the multi-tenant database system; and
wherein the sample table is indirectly accessible to the customer organizations through the query interface and a query optimizer of the system which performs query optimization on queries for execution against the multi-tenant database system.

12. The system of claim 11, wherein each of the plurality of separate and distinct customer organizations which utilize the multi-tenant database system is an entity selected from the group consisting of: a separate and distinct remote organization, an organizational group within the host organization, a business partner of the host organization, or a customer organization that subscribes to cloud computing services provided by the host organization.

13. A method to execute within a host organization having at least a processor and a memory therein, wherein the method comprises:
storing records in a database system of the host organization, the database system having a plurality of database tables, each of the plurality of database tables to store database records, wherein each of the plurality of database tables embodies a trigger component, stored within the respective database table;

embodying a trigger component within each respective database table, wherein the trigger component is to initiate a hash function of the primary key for the respective database table upon a database insert transaction of a new database record being inserted into the respective database table and upon any change or delete transaction for any of the database records within the respective database table;

receiving database transactions at a query interface, the query interface to submit the database transactions to the database system;

triggering, via the trigger component, a hash function for each one of the database transactions;

wherein the hash function hashes a primary key of each database record being inserted at the database system at pursuant to the database transactions to determine whether a first hash value of the primary key of the database record being inserted satisfies a sampling condition;

maintaining a sample table within a query optimizer, wherein the sample table is maintained by the query optimizer separate from the plurality of database tables of the database system, wherein the sample table is to store a sample record corresponding to any database record being inserted into the respective database table of the database system which satisfies the sampling condition based on the hash function pursuant to the trigger component and further wherein the sample table is to update or delete any database record being changed or deleted within the respective database table which satisfies the sampling condition based on the hash function pursuant to the trigger component;

storing within the sample table, a sample record corresponding to any database record being inserted into the database which satisfies the sampling condition based on the hash function and updating within the sample table;

continuously maintaining, via the trigger component embodied within the database tables, sampled records in the sample table upon any insert, change, or deletion to records within the respective database table satisfying the sampling condition based on the hash function;

wherein triggering the hash function includes initiating the hash function upon any database record delete transaction for the table within which the respective hash function trigger resides and, responsive to a database record delete transaction, performing a hash of the primary key for a database record being deleted pursuant to the database record delete transaction to determine whether the database record being deleted satisfies the sampling condition indicating a sample record within the sample table must also be deleted or marked for deletion;

providing a primary key index having therein an index of the primary keys of the sample records stored in the sample table;

receiving a query at the query interface of the database system, wherein the queries to the database system are processed through the query interface and wherein the trigger component to initiate the hash function on database insert transactions resides within the query interface;

optimizing the received query at the query optimizer of the host organization by applying a plurality of filters to the sample table and selecting one of the plurality of filters causing the fewest number of records to be returned from the sample table, and wherein the query interface is to pass the trigger component to the query optimizer to perform the hash function for each database record being inserted into the database system to determine whether the database record being inserted satisfies a sampling condition; and executing the optimized query against the database system, wherein the optimized query applies the selected one of the plurality of filters to the database system in fulfillment of executing the received query.

14. The method of claim 13, wherein the hash function determines whether the database record being inserted satisfies the sampling condition by performing the following operations:

generating the first hash value of the primary key of the database record being inserted;

receiving the first hash value as a numeric value output from the hash function;

determining whether the numeric value output by the hash function falls within a specified sampling range of all possible values for the numeric value output by the hash function; and the primary key in its un-hashed form into the primary key index of the sample table and additionally insert the second hash value corresponding to the second hash of the primary key in its hashed form into the ordered hash index of the sample table when the numeric value output by the hash function is determined to fall within the specified sampling range or alternatively to discard the hash of the primary key without insertion into either the primary key index or the ordered hash index of the sample table when the numeric value output by the hash function is determined to fall outside of the specified sampling range.

15. Non-transitory computer readable storage media having instructions stored thereon that, when executed by a processor of a system, the instructions cause the system to perform operations comprising:

storing records in a database system of the host organization, the database system having a plurality of database tables, each of the plurality of database tables to store database records, wherein each of the plurality of database tables embodies a trigger component, stored within the respective database table;

embodying a trigger component within each respective database table, wherein the trigger component is to initiate a hash function of the primary key for the respective database table upon a database insert transaction of a new database record being inserted into the respective database table;

receiving database transactions at a query interface, the query interface to submit the database transactions to the database system;

triggering, via the trigger component, a hash function for each one of the database transactions;

maintaining a sample table within a query optimizer, wherein the sample table is maintained by the query optimizer separate from the plurality of database tables of the database system, wherein the sample table is to store a sample record corresponding to any database record being inserted into the respective database table of the database system which satisfies the sampling condition based on the hash function pursuant to the trigger component;

storing within the sample table, a sample record corresponding to any database record being inserted into the database which satisfies the sampling condition based on the hash function and updating within the sample table;

continuously maintaining, via the trigger component embodied within the database tables, sampled records in the sample table upon any insert, change, or deletion to records within the respective database table satisfying the sampling condition based on the hash function;

wherein triggering the hash function includes initiating the hash function upon any database record delete transaction for the table within which the respective hash function trigger resides and, responsive to a database record delete transaction, performing a hash of the primary key for a database record being deleted pursuant to the database record delete transaction to determine whether the database record being deleted satisfies the sampling condition indicating a sample record within the sample table must also be deleted or marked for deletion;

providing a primary key index having therein an index of the primary keys of the sample records stored in the sample table;

receiving a query at the query interface of the database system, wherein the queries to the database system are processed through the query interface and wherein the trigger component to initiate the hash function on database insert transactions resides within the query interface;

optimizing the received query at the query optimizer of the host organization by applying a plurality of filters to the sample table and selecting one of the plurality of filters causing the fewest number of records to be returned from the sample table, and wherein the query interface is to pass the trigger component to the query optimizer to perform the hash function for each database record being inserted into the database system to determine whether the database record being inserted satisfies a sampling condition; and executing the optimized query against the database system, wherein the optimized query applies the selected one of the plurality of filters to the database system in fulfillment of executing the received query.

16. The non-transitory computer readable storage media of claim 15, wherein the hash function determines whether the database record being inserted satisfies the sampling condition by performing the following operations:

generating the first hash value of the primary key of the database record being inserted;

receiving the first hash value as a numeric value output from the hash function;

determining whether the numeric value output by the hash function falls within a specified sampling range of all possible values for the numeric value output by the hash function; and the primary key in its un-hashed form into the primary key index of the sample table and additionally insert the second hash value corresponding to the second hash of the primary key in its hashed form into the ordered hash index of the sample table when the numeric value output by the hash function is determined to fall within the specified sampling range or alternatively to discard the hash of the primary key without insertion into either the primary key index or the ordered hash index of the sample table when the numeric value output by the hash function is determined to fall outside of the specified sampling range.

* * * * *